United States Patent [19]
Kumagai et al.

[11] 3,891,910
[45] *June 24, 1975

[54] MACHINE TOOL MOTOR CONTROL WITH POSITION OFFSET

[75] Inventors: Tom T. Kumagai, Gardena; William C. Leone, Palos Verdes Estates; Michael May, Santa Monica; Harold L. Shoemaker, Manhattan Beach; Roy A. Howard, Los Angeles, all of Calif.

[73] Assignee: Houdaille Industries, Inc., Buffalo, N.Y.

[ * ] Notice: The portion of the term of this patent subsequent to Sept. 28, 1988, has been disclaimed.

[22] Filed: Sept. 16, 1971

[21] Appl. No.: 181,168

Related U.S. Application Data

[60] Continuation of Ser. No. 598,525, Jan. 12, 1966, Pat. No. 3,609,497, which is a division of Ser. No. 827,981, March 10, 1959, Pat. No. 3,245,144.

[52] U.S. Cl. ............... 318/572; 318/601; 318/603; 235/151.11; 90/13
[51] Int. Cl. .......................................... G05b 19/24
[58] Field of Search.................... 318/572, 601, 603

[56] References Cited
UNITED STATES PATENTS
3,609,497   9/1971   Kumagai et al..................... 318/601

*Primary Examiner*—T. E. Lynch
*Attorney, Agent, or Firm*—Hill, Gross, Simpson, Van Santen, Steadman, Chiara & Simpson

[57] ABSTRACT

A numerically controlled machine tool in which dimensional information is programmed with reference to a cutting tool centerline, or with reference to a cutting tool of standard dimension, provision being made for correcting such dimensional information by means of a position offset facility coupled to the numerical control so that dimensional information is modified in a sense to provide an indication of a desired position that accommodates a specific cutting tool dimension or other offset requirement, circulating register means being provided for circulating data with respect to a plurality of axes, and common arithmetic circuitry serving to process the data for the respective axes as the data circulates from the circulating register means through the common arithmetic circuitry.

3 Claims, 23 Drawing Figures

Fig. 3.

| TAPE COLUMN LETTER | | | | ROW No. | COLUMN LETTER | | | | | | | | PARTY COLUMN | |
|---|---|---|---|---|---|---|---|---|---|---|---|---|---|---|
| c | d | e | f | | a | b | c | d | e | f | g | h | Ta | |
| | | | | 1 | | | 50 | ○ | | | | SC | | ⎫ Swh |
| | | Rt1 | Rsvr1 | 2 | OPER NO. | | | | IND. | C | | | | |
| | | Rt2 | Rt3 | 3 | | | | | TABLE | | | | | |
| | | Rc1 | Rc2 | 4 | | | | | COOLANT | | | | | ⎬ Swv |
| | Rma | | Rsv2 | 5 | ⊠ | | | MA | SPINDLE SPEED | | | | | |
| (Rer5) | (Rev5) | Rsv3 | Rsv4 | 6 | ⊠ | MACH. NO. | | | | | | | | |
| Rf2 | Rfz | Rsv5 | Rsv6 | 7 | ⊠ | REF. COMM | | | | | | | | ⎭ |
| | | | | 8 | + | ⊠ | 2 | 1 | CA | | | | Sd 1 | |
| | | Rvx1 | Rvx2 | 9 | 8 | 4 | 2 | 1 | TRAVERSE RATE | | | | Sd 2 | |
| | | Rvx3 | Rvx4 | 10 | X DIM | | | | | | | | Sd 3 | |
| | | Rvx5 | Rvx6 | 11 | | | | | | | | | Sd 4 | ⎬ Swx |
| | | Rbx | Rax1 | 12 | | | | | R | RZ | | | Sd 5 | |
| | | | Rux | 13 | 1ST COR FOR X DIM. | | | | | IC | | | Sd 6 | |
| | | | | 14 | 2ND COR FOR X DIM. | | | | ⊠ | | | | Sd 7 | |
| | | | | 15 | ± | ⊠ | 2 | 1 | CA | | | | Sd 1 | |
| | | Rvy1 | Rvy2 | 16 | 8 | 4 | 2 | 1 | TRAVERSE RATE | | | | Sd 2 | |
| | | Rvy3 | Rvy4 | 17 | Y DIM | | | | | | | | Sd 3 | |
| | | Rvy5 | Rvy6 | 18 | | | | | | | | | Sd 4 | ⎬ Swy |
| | | Rby | Ray1 | 19 | | | | | R | RZ | | | Sd 5 | |
| | | | Ruy | 20 | 1ST COR FOR Y DIM. | | | | | IC | | | Sd 6 | |
| | | | | 21 | 2ND COR FOR Y DIM. | | | | ⊠ | | | | Sd 7 | |
| | | | Rcz1 | 22 | ± | ⊠ | 2 | 1 | CA | | | | Sd 1 | |
| | | Rvz1 | Rvz2 | 23 | 8 | 4 | 2 | 1 | TRAVERSE RATE | | | | Sd 2 | |
| | | Rvz3 | Rvz4 | 24 | Z DIM. | | | | | | | | Sd 3 | |
| | | Rvz5 | Rvz6 | 25 | | | | | | | | | Sd 4 | ⎬ Swz |
| | | Rbz | Raz1 | 26 | | | | | R | RZ | | | Sd 5 | |
| | | | Ruz | 27 | 1ST COR FOR Z DIM. | | | | | IC | | | Sd 6 | |
| | | | Rtp | 28 | 2ND COR FOR Z DIM | | | | | TP | | | Sd 7 | |
| | | | | 29 | | | | | | | EB | EB | | ⎱ Swe |
| c | d | e | f | 30 | | | | | | | | | | |
| | | | | 31 | SPACE FOR SPLICING | | | | | | | | | |
| | | | | 32 | | | | | | | | | | |
| | | | | 33 | | | | | | | | | | |
| | | | | 34 | | | | | | | | | | |
| | | | | 1 | | | | ○ | | | | SC | | |

NOTES:
S.C. — Start Code
T.P. — Transfer Part
M.A. — Multiple Axis
R. — Retract to Zero
R.Z. — Retract to Datum Reference
M. — Move
⊠ — Spare Hole
Parity — Odd
C. — Change of spindle speed
E.B. — End of block
C.A. — Cutter Adjustment
I.C. — Inhibit Creep.

WORD SYMBOLS (GENERATED BY STEP SWITCH SS2)

DIGIT SYMBOLS (GENERATED BY STEP SWITCH SS2)

DIRECTION OF TAPE FEED

S1

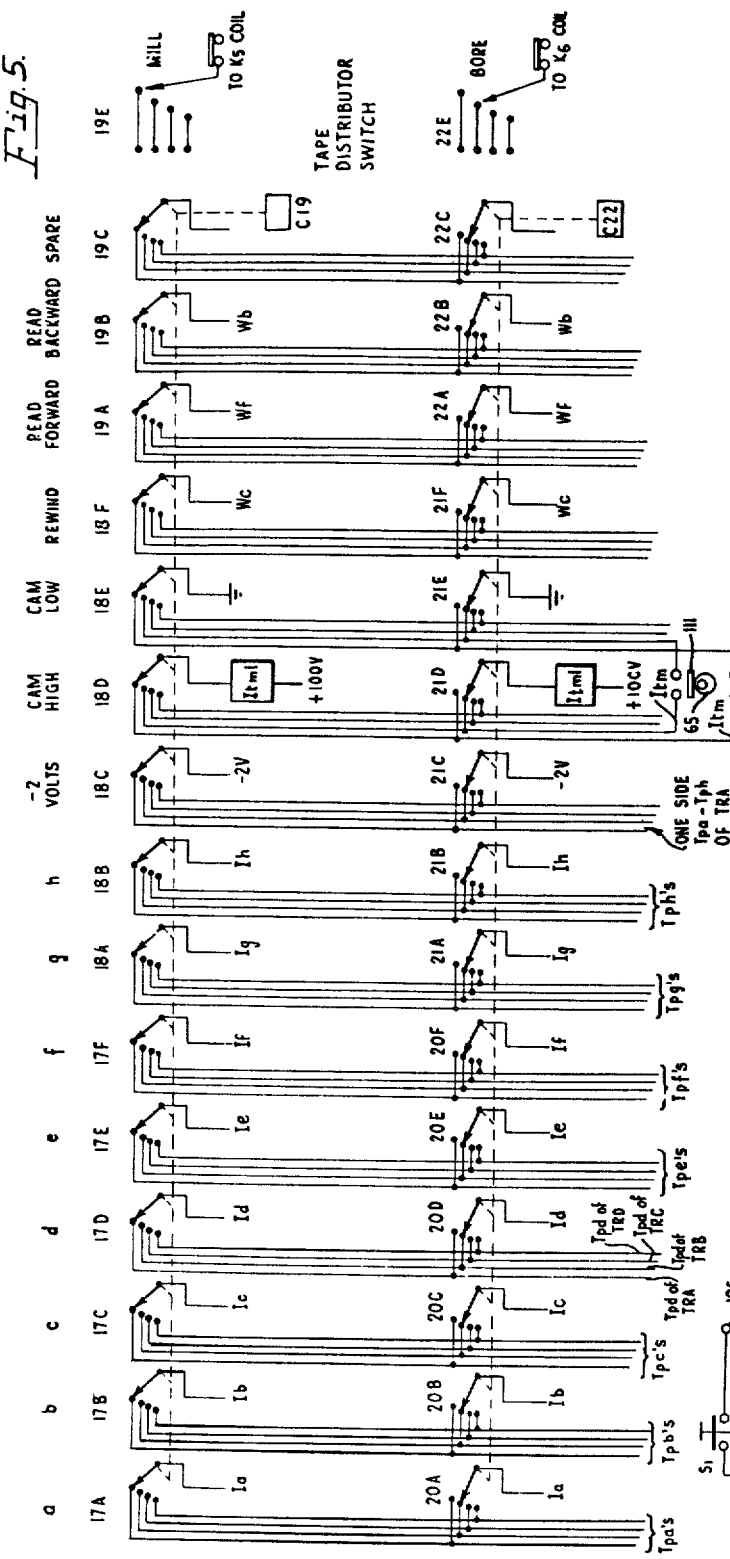
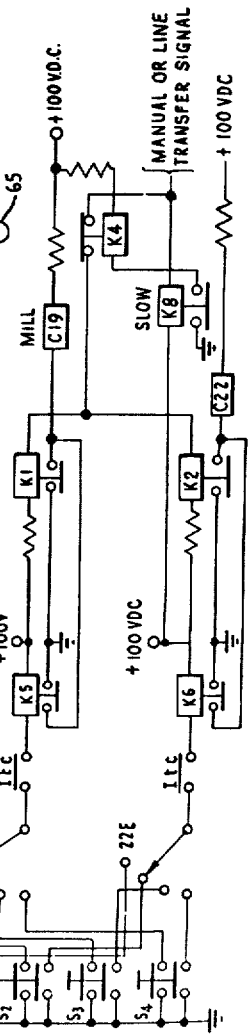
Fig. 5.
Fig. 5A.

| BIT TIME COUNTER | | | | | | | |
|---|---|---|---|---|---|---|---|
| BIT TIME | FB1 | FB2 | FB3 | FB4 | FB5 | C1 | C2 |
| b1 | 0 | 0 | 0 | 0 | 1 | 0 | |
| b2 | 0 | 0 | 0 | 1 | 0 | 1 | |
| b3 | 0 | 0 | 0 | 1 | 1 | 1 | |
| b4 | 0 | 0 | 1 | 0 | 0 | 1 | |
| b5 | 0 | 0 | 1 | 0 | 1 | 0 | |
| b6 | 0 | 0 | 1 | 1 | 0 | 0 | |
| b7 | 0 | 0 | 1 | 1 | 1 | 1 | |
| b8 | 0 | 1 | 0 | 0 | 0 | 1 | |
| b9 | 0 | 1 | 0 | 0 | 1 | 1 | |
| b10 | 0 | 1 | 0 | 1 | 0 | 0 | |
| b11 | 0 | 1 | 0 | 1 | 1 | 0 | |
| b12 | 0 | 1 | 1 | 0 | 0 | 1 | |
| b13 | 0 | 1 | 1 | 0 | 1 | 1 | |
| b14 | 0 | 1 | 1 | 1 | 0 | 1 | |
| b15 | 0 | 1 | 1 | 1 | 1 | 0 | |
| b16 | 0 | 0 | 0 | 0 | 0 | 0 | |
| b17 | 1 | 0 | 0 | 0 | 1 | 1 | 1 |
| b18 | 1 | 0 | 0 | 1 | 0 | 1 | 1 |
| b19 | 1 | 0 | 0 | 1 | 1 | 1 | 1 |
| b20 | 1 | 0 | 1 | 0 | 0 | 0 | 1 |
| b21 | 1 | 0 | 1 | 0 | 1 | 0 | |
| b22 | 1 | 0 | 1 | 1 | 0 | 1 | 1 |
| b23 | 1 | 0 | 1 | 1 | 1 | 1 | 1 |
| b24 | 1 | 1 | 0 | 0 | 0 | 1 | 1 |
| b25 | 1 | 1 | 0 | 0 | 1 | 0 | 1 |
| b26 | 1 | 1 | 0 | 1 | 0 | 0 | |
| b27 | 1 | 1 | 0 | 1 | 1 | 1 | 1 |
| b28 | 1 | 1 | 1 | 0 | 0 | 1 | 1 |
| b29 | 1 | 1 | 1 | 0 | 1 | 1 | 1 |
| b30 | 1 | 1 | 1 | 1 | 0 | 0 | 1 |

(b17–b20 bracketed as Z; b22–b25 bracketed as X; b27–b30 bracketed as Y)

Fig. 15

| PHASE COUNTER | | | |
|---|---|---|---|
| PHASE | FP1 | FP2 | FP3 |
| S0 | 0 | 0 | 0 |
| S1 | 0 | 0 | 1 |
| S2 | 0 | 1 | 0 |
| S3 | 0 | 1 | 1 |
| S4 | 1 | 0 | 0 |
| S5 | 1 | 0 | 1 |
| S6 | 1 | 1 | 0 |
| S7 | 1 | 1 | 1 |

Fig. 17

| PRESENT POSITION REGISTER | | | | | | | | |
|---|---|---|---|---|---|---|---|---|
| CR1 | | | | | | | | |
| A | B | C | A | B | C | A | B | C |
| X word | | | Y Word | | | Z Word | | |

| DESIRED POSITION REGISTER | | | | | | | | |
|---|---|---|---|---|---|---|---|---|
| CR2 | | | | | | | | |
| A | B | C | A | B | C | A | B | C |
| X Word | | | Y Word | | | Z Word | | |

A – Dimension
B – Error check
C – Control of input logic

Fig. 12

| WORD COUNTER | | |
|---|---|---|
| WORD | FQa1 | FQa2 |
| X | 0 | 0 |
| Y | 1 | 0 |
| Z | 0 | 1 |

Fig. 16

| STEPPING SWITCH SS2 | | | |
|---|---|---|---|
| WORD SIGNALS | SWITCH CONTACTS | DIGIT SIGNALS | SWITCH CONTACTS |
| Swh | Home | Sd1 | E7, E14, E21 |
| Swv | D1-D6 | Sd2 | E8, E15, E22 |
| Swx | D7-D13 | Sd3 | E9, E16, E23 |
| Swy | D14-D20 | Sd4 | E10, E17, E24 |
| Swz | D'1 & D-21-D26 | Sd5 | E11, E18, E25 |
| Swe | D'2 | Sd6 | E12, E19, E26 |
| Swb | D'3-D'25 | Sd7 | E13, E20, E'1 |

Fig. 7A

|   | X4 | X3 | X2 | X1 | XS |
|---|----|----|----|----|----|
| 0 | 0  | 0  | 0  | 0  | 1  |
| 1 | 0  | 0  | 0  | 1  | 0  |
| 2 | 0  | 0  | 1  | 0  | 0  |
| 3 | 0  | 0  | 1  | 1  | 1  |
| 4 | 0  | 1  | 0  | 0  | 0  |
| 5 | 0  | 1  | 0  | 1  | 1  |
| 6 | 0  | 1  | 1  | 0  | 1  |
| 7 | 0  | 1  | 1  | 1  | 0  |
| 8 | 1  | 0  | 0  | 0  | 0  |
| 9 | 1  | 0  | 0  | 1  | 1  |

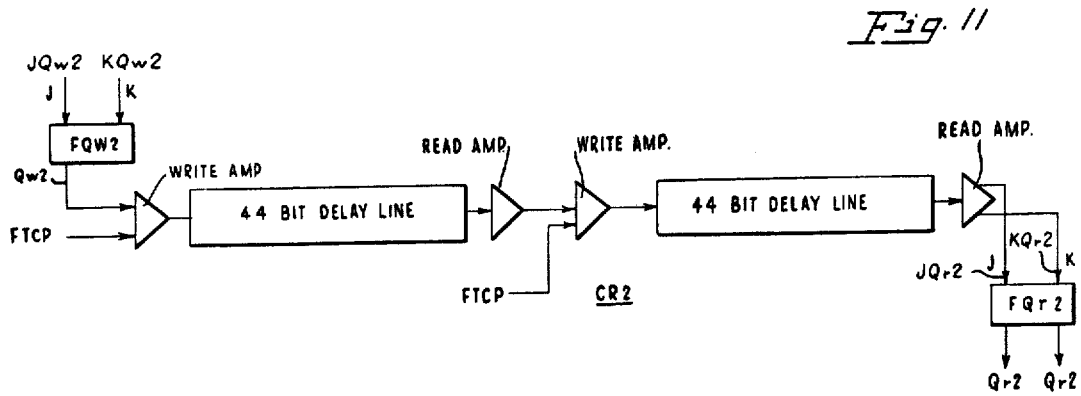
Fig. 9
Fig. 11
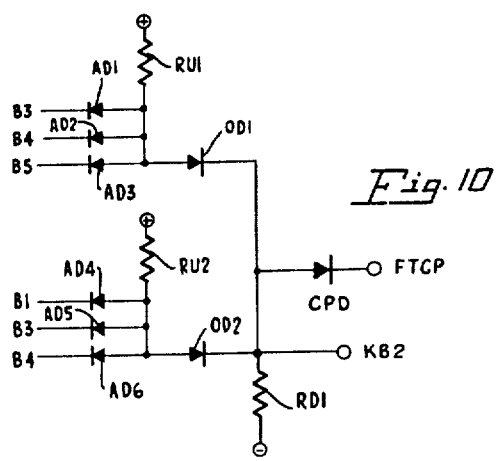
Fig. 10

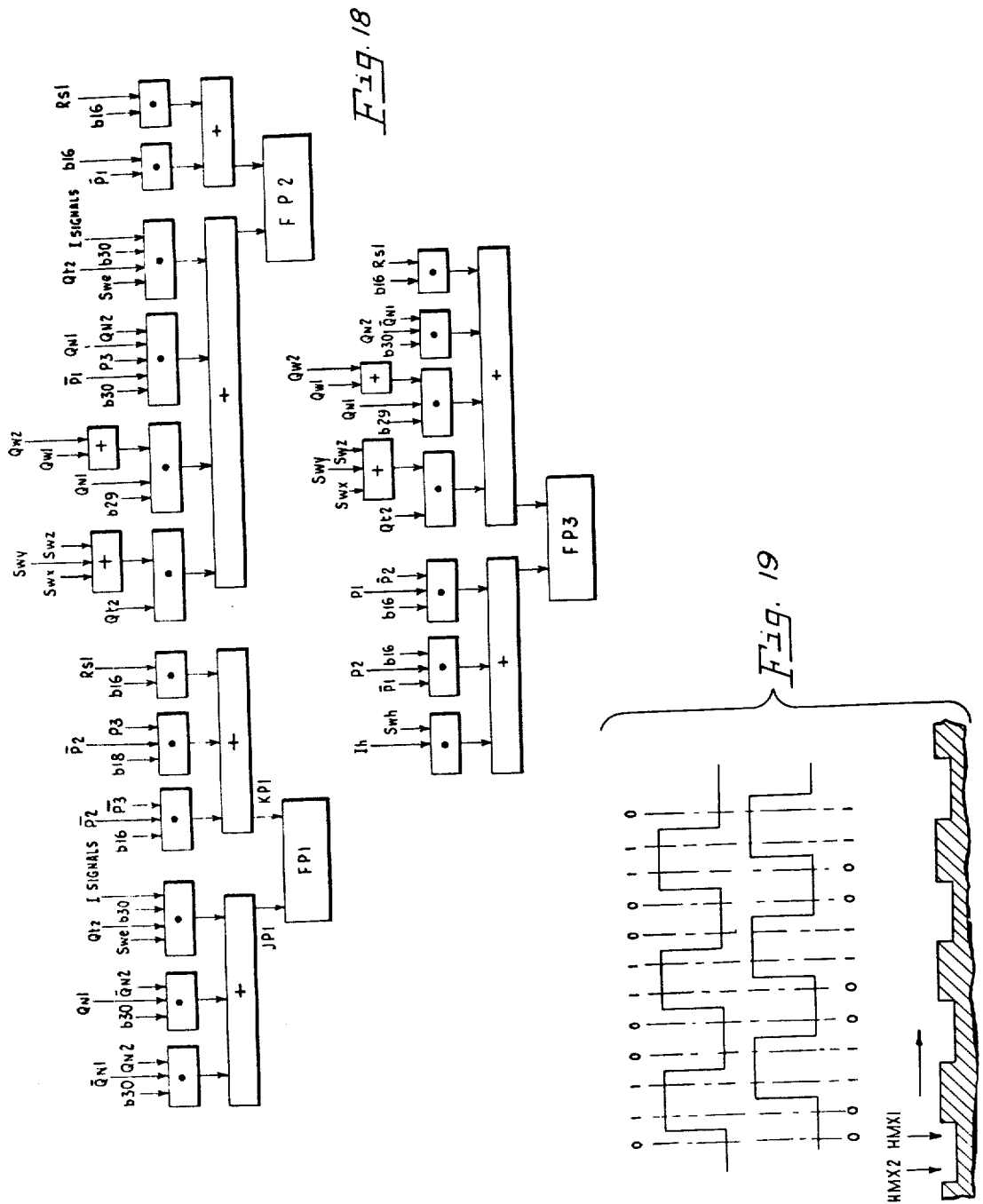

3,891,910

MACHINE TOOL MOTOR CONTROL WITH POSITION OFFSET

CROSS REFERENCES TO RELATED APPLICATIONS

The present application is a continuing application based on application Ser. No. 598,525 filed Jan. 12, 1966, now U.S. Pat. No. 3,609,497 issued Sept. 28, 1971, and said application Ser. No. 598,525 in turn is a division of application Ser. No. 827,981, filed Mar. 10, 1959, now U.S. Pat. No. 3,245,144 issued Apr. 12, 1966.

SUMMARY OF THE INVENTION

This invention relates generally to machine tool systems and to numerically controlled systems therefor.

Many existing types of automatic machine tools involve a single tool having multiple simultaneously operated or individually operated cutting tools. In some instances these cutting tools are adjustable within small limits to provide a minor degree of flexibility in performing a particular cutting operation on a workpiece. In still other instances a line of machine tools each carrying one or more cutting tools may be involved. Usually the machine tool lines inhere the same character of problem, namely a lack of flexibility, as do the multiple tool single machine assemblies. For the most part, therefore, these systems, while properly being referred to as automatic machine tool systems, are relatively inflexible and if any change in the design of a part which would be handled by such automatic machine tool systems is made, it is usually necessary that major alterations in the physical organization of the automatic tool system be made. From this elementary consideration, it is apparent that such sophisticated tooling for automatic production purposes is justifiable only where large volume production of a single part is needed. If more that one part is involved, then usually separate automatic tool systems are required to handle the individual parts, in view of the lack of flexibility in the individual automatic tool arrangements.

Accordingly, one object of this invention is to provide a machine tool system which is simple with respect to operational requirements and reliable and flexible in operation.

It is also an object of this invention to provide a machine tool system of the character referred to which is numerically or digitally controlled.

A further object of this invention is to provide an automatic machine tool system of the numerically controlled type wherein each part is provided with a particular numerical program which may remain unchanged irrespective of wear on the various cutting tools in the tool system.

Further to the preceding objects, it is an object of this invention to provide an automatic machine tool system containing provisions for compensating tool wear, i.e. different sizes of tools, independently of the numerical programs for the individual parts.

Further separate and combined objects of this invention are to provide a machine tool system of the numerically controlled type which utilizes numerical programming techniques of a character to facilitate the make-up of numerical programs for machine operations on individual parts and which utilizes fixed cutting tools standards for numerically programming the finished dimensions of parts to be machined.

The provision of automatic controls for industrial operations of this general character requires specific considerations of the environmental circumstances in which the systems must function. In a machine tool application, or in production line applications, where automatic assembly of parts is required, speed and accuracy are factors which must be taken into account. Additionally, in almost any industrial environment, vibration may be a factor. Vibration may materially affect the operation of certain electronic components and may also adversely affect transducers which are used in sensing the position of a workpiece, cutting tools, or other parts which may be positioned for assembly purposes in a production line.

With regard to speed and accuracy, of course, the overall characteristics of the system must be considered. While it is true that the speed of occurrence of discrete electrical signals in numerical types of controls may be of the order of a few microseconds in duration, the number of such signals which must be handled, especially in serial type controls, is of a very high order. In positioning systems where counting techniques must be employed, both from the standpoint of indicating desired positions for the position of parts and present position of the parts, the time required to handle all of the discrete signals indicating these two positions must be sufficiently short that adequate positioning speeds at the workpiece or part to be positioned may be realized. Otherwise, the operation may be too slow to be practical.

The matter of accuracy must necessarily meet the minimum requirements of the application. In machine tool applications, normal machining requirements may be of the order of + or − one half-thousandths of an inch, but in some situations accuracies of the order of one ten thousandths of an inch may be required. Hence, a system of this type must be organized to normally provide or meet the minimum accuracy requirements and must also be operable with some minor special considerations involving, for example, no more than a trial run, to preset the system to meet more stringent tolerances.

INCORPORATION BY REFERENCE

The disclosure of U.S. Pat. No. 3,245,144 is incorporated herein by reference, particular attention being directed to sections of this patent as follows:

Drawings — FIGS. 22, 22a in addition to FIGS. 1–21 physically present herein.

Tape Format and Tape Format Coding — Columns 9 through 23.

Counters and Scale Counters — Columns 29 through 34.

Elementary System of FIGS. 22 and 22a — Columns 35 through 38.

Input Section — Columns 39 through 46.

Phase States and Functions — Columns 46 through 49.

BRIEF DESCRIPTION OF THE DRAWINGS

FIGS. 1–231 are briefly described in U.S. Pat. No. 3,245,144 referenced above, at column 5, line 74 through column 6, line 71.

DESCRIPTION OF FIGS. 1–21

Figure 1:
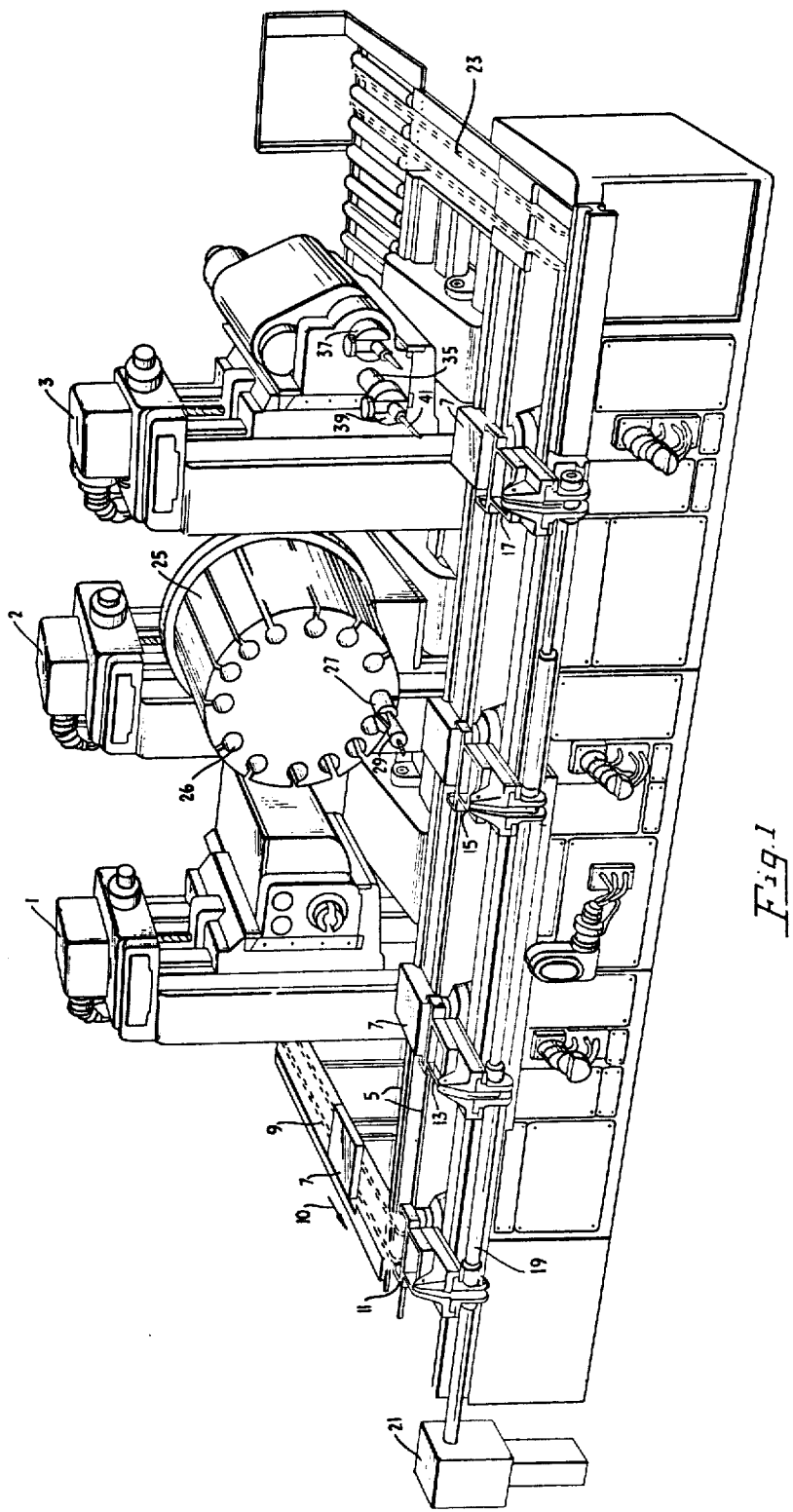

FIG. 1 of the drawings is a perspective drawing illustrating the general organization of a machine tool line of the type herein employed. In this figure, three machine tools, a mill generally designated 1, a drill generally designated 2 and a bore generally designated 3, are provided with similar base sections, the front portion of each of which is provided with a set of parallel ways 5. The base sections are provided with complementary faces, not shown, which are adapted to be fitted together to form a continuous set of ways 5 extending completely along and somewhat past the ends of the tool assembly. Ways 5 receive pallets 7 which are adapted to have workpieces or parts to be machined, not shown, secured thereon in a predetermined position. On the left end of the machine tool assembly as viewed, there is provided a loading station represented in a conveyor chain, generally designated 9, which has a direction of movement indicated by arrow 10, from the back towards the front of the machine assembly. The conveyor extends through suitable transverse slots on the left end of ways 5 and is provided with a suitable elevating and lowering control, not shown, such that movement of a pallet 7 into a position over ways 5 may be effected when the conveyor is in its upper most position. Suitable stops not shown, arrest the forward movement of the pallet in a position in which the pallet is accurately indexed over the ways 5. Thereafter the conveyor may be lowered so that the pallet is seated and guided by the ways 5.

In this position of the pallet on ways 5, the pallet is in a position to be straddled by a fork assembly 11 forming part of a hydraulically operated transfer mechanism including three additional forks 13, 15 and 17 all of which are connected to a common telescoping rod assembly 19 extending along the front of the machine tool assembly and controlled by a suitable power means, generally designated 21, which may be hydraulic in character, which is capable of providing cyclic modes of operation for the several fork assemblies. In a first mode the forks are advanced to a position in which the respective forked extremities straddle respective pallets 7 at the loading station and at the various machine stations, if the latter are in position at the machine stations. Thereafter power means 21 is operative to displace the transfer mechanism forks toward the right from the position indicated, whereby a pallet 7 at the boring machine 3 is displaced from the boring machine work station to an unloading conveyor chain 23. Intermediate pallets at the mill and drill are advanced to machine work stations adjacent the drill and bore, respectively, and the pallet on the ways at the loading station is transferred into the machine work station at the mill. Thereafter the forks are simultaneously retracted and returned to the positions illustrated in preparation for a further transfer operation.

Unloading conveyor chain 23 is also operated between upper and lower positions by a suitable elevating and lowering mechanism, not shown. When a part is being transferred from the last machine station to the unloading station, conveyor chain 23 is in its lowermost position. When the transfer is completed, conveyor chain 23 is elevated to pick up the pallet placed thereabove and convey the pallet from the front of the machine to the back of the machine for unloading.

The details of the various mechanisms involved in the transfer mechanism and the organization of such mechanisms are not illustrated in the interest of simplicity since such mechanisms, per se, form no part of the present invention.

Each work station adjacent a machine tool includes a rotary table, not shown, which receives the respective pallets. These tables are mounted in fixed positions in the line and are each equipped with rotary type power drives providing 360° rotation of the associated table about a vertical axis. Each table is normally disposed in a fixed angular position, in which position it receives the pallets. Each table is also provided with a stop which accurately indexes the pallet as the pallet is moved into position thereabove by the transfer mechanism and is further provided with clamping means engaging complementary portions on the pallet thereabove to securely clamp the pallet in a positive indexed position on the rotary table. The control system for that machine tool under the control of instructions received from the machine program on the tape accurately angularly indexes the table together with the pallet and workpiece thereon as required. Prior to transfer of the workpiece from a machine station, of course, the table lock is released and the stop removed. This also is automatically controlled.

As will be seen by reference to drill machine 2, the drilling machine is provided with a rotatable drum 25 provided with a plurality of axial drills arranged in a circle in the drum. Each drill carries a quill assembly, one of which appears in extended position and is designated 27 and which is slidably mounted therein and suitably keyed to prevent rotation of the quill assembly. These respective quill assemblies rotatably and slidably receive spindles 29 mounting drills, or taps, or both. Indexing of the drill drum is accomplished by suitable power means, not shown, under the control of the control system, in turn controlled by instructions received from the tape. Each particular tool has a specified angular position and thus a particular address for a tap or a drill, of a certain size may be written in the tape. Thus, the control system is enabled to angularly index the drill drum to select the proper tool. The drill drum is mounted on the drill machine so that it is provided with two degrees of freedom in translation represented in orthogonally related axes X and Y for longitudinal, and vertical displacement, respectively. Hence, an angularly indexed drill may be positioned adjacent the workpiece in axial alignment with the precise spot at which a hole is to be drilled. Thereafter the quill assembly is advanced under control of the Z axis program to a position in which a drill or tap guide, not shown, on each quill assembly, is positioned at a point within chip clearance distance of the workpiece face. Following this, the drill is advanced into the workpiece. Positioning of the quill assembly, the feed rate of the drill and the depth of drilling, are all programmed from the tape. Again, when the drilling operation is completed the drill spindle is retracted, the quill assembly is retracted, the drill drum may be returned to its datum or zero angular position, or, indexed to select a tap, if a tapping operation is required, or, indexed to select another drill if another drilling operation is required. When all operations are completed, the drill machine may be zeroed in each of its X, Y and Z axes of freedom.

Boring machine 3 is provided with two spindle assemblies 35 and 37 which are suitably mechanically interlocked so that when one is advanced the other is retracted. Each boring spindle assembly is provided with a cutter head 39 which is suitably mechanically arranged to provide radial displacement of a boring tool 41 mounted therein to provide boring at differing diameters. The radial adjustment of the boring cutter is automatically accomplished through the control system on the basis of programmed instructions from the tape. The details of this mechanism are not shown in the interest of simplicity since, per se, they form no part of this invention. Here also, the boring machine is provided with 3° of freedom about longitudinal, vertical and cross axes X, Y and Z respectively, which are orthogonally related.

Figure 2:
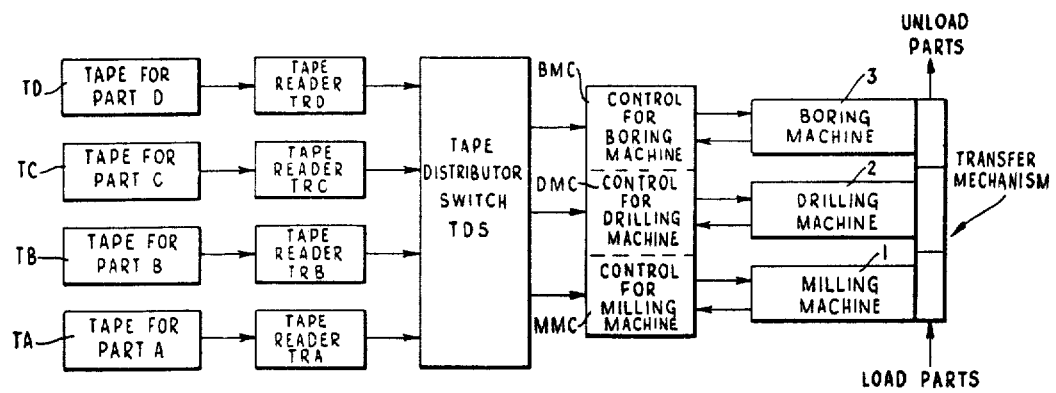
Figure 4:
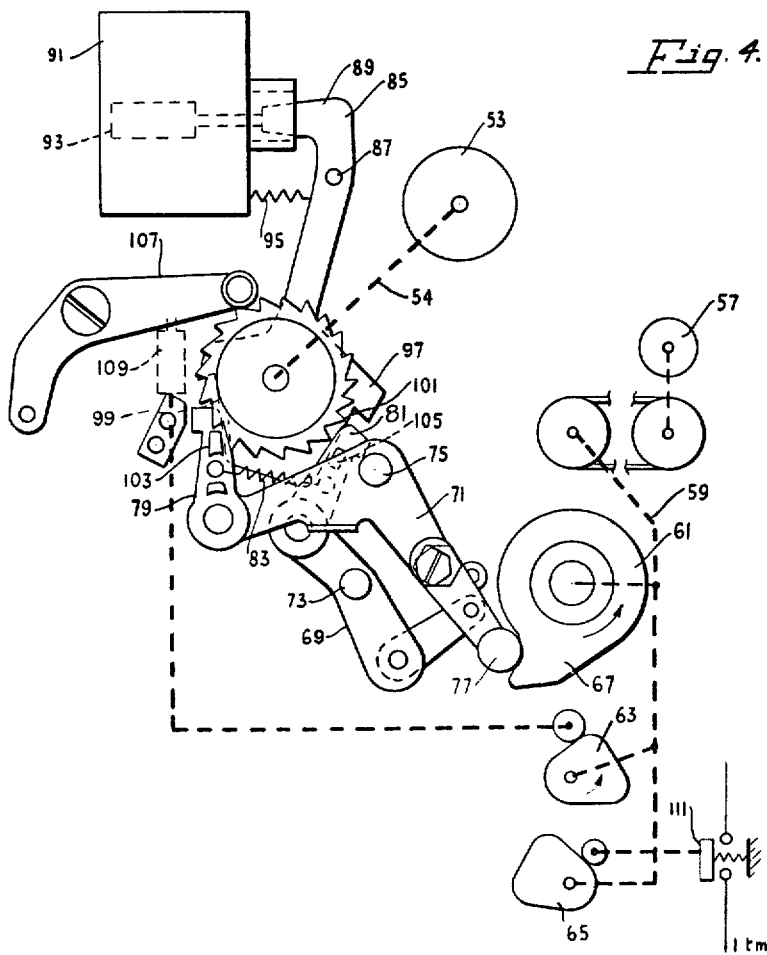

The organization of the machine tool line shown in FIG. 1 in an over-all system is illustrated in FIG. 2 in block diagram form. In this figure, the three machine tools are again designated 1, 2 and 3 for the milling machine, the drilling machine and the boring machine, respectively. The transfer mechanism interconnecting the three machines and which physically provides the transfer of the parts from the loading station through the machine stations to the unloading station is generally designated as TM and represented in block form. In this arrangement, four tape readers, TRA, TRB, TRC and TRD, respectively, are utilized. These respectively read information from tapes TA, TB, TC and TD. The outputs of the tape readers appearing as discrete electrical signals are applied to a tape distributor switch, generally designated TDS, which selectively switches the information from the tapes to the respective electrical controls for the milling machine designated MMC, for the drill machine DMC and for the boring machine designated BMC. By way of explanation the electrical output of the tape reader TRA is first applied to the milling machine control MMC. When the milling operations on Part A are completed at the milling machine work station, the transfer mechanism under the control of the control for milling machine MMC switches or transfers the part to the drilling machine. At the same time the output connections of the tape reader TRA are physically transferred by the tape distributor switch from the milling machine to the drilling machine control DMC. At this point, a Part B may have been moved into position adjacent the milling machine work station and the tape reader TRB containing all of the machine instructions for the Part B electrically connected by the tape distributor switch to the milling machine control MMC. Again after the machine operations at both the milling machine and drilling machine are completed, a Part C may be moved into the line of the milling machine work station at the time the transfer of the parts in the tool line are effected. Thus, all three machines will be loaded with workpieces. At this time, the tape reader A will be connected through the tape distributor switch to the control BMC for the boring machine so that the boring machine operations on Part A may take place. Tape reader B will now be connected through the tape reader distributor switch TDS to the control DMC for the drilling machine and Part B will be drilled as required by the instructions contained in the tape for Part B. New Part C which is now in the milling machine work station position will be milled according to instructions provided by tape C and applied from the tape reader through the tape distributor switch to the control MMC for the milling machine. Meanwhile part D may be readied at the loading station for the machine tool line, its tape reader TRD having a tape TD including all of the instructions for performing all of the machine operations on the part D on the machine tool line. When the machine operations on the three parts A, B and C now in the line are completed and transfer is again effected, Part A will be moved to the unloading station, Part B transferred to the boring machine, Part C transferred to the drilling machine, and Part D moved into position at the milling machine. With this arrangement the operation of the line is essentially continuous and is completely automatic requiring only the manual loading of workpieces mounted on suitable pallets at the loading station for the tool line and the introduction of the proper tape for the respective parts at the spare tape reader prior to the introduction of the workpiece into the line of tools.

A better understanding of this invention may be had by considering certain of the elements included herein before proceeding with further discussion concerning the over-all system.

CIRCULATING REGISTERS

A system of this type in handling discrete electrical signals requires some form of memory for at least temporarily storing and/or circulating information being processed in the system. The present system employs a dynamic type of circulating register arrangement in each of three places in the system. Typical of these is the circulating register arrangement illustrated in block form in FIG. 11. This type of circulating register employs a well-known nickel delay line having a read coil at one end and a write coil at the other end of the register. Pulses are applied to the write coil and by magnetostrictive action coupled into the nickel delay line. Velocity of propagation of discrete signals in the line is approximately of the order of 15.7 microseconds per inch. These pulses are coupled into the read coil which produces an electrical output signal as each pulse transverses the coil. In order to handle all of the information necessary for each complete instruction word, the circulating registers are 90 binary bits in length, that is 90 binary bit times are accumulated along the length of a single register. To obviate timing problems resulting from line length changes with temperature variations, the nickel delay lines are physically split into two sections each of which is 44 bits in length. The over-all arrangement of such a register, here referred to as circulating register CR2, which is the desired position register in the system yet to be described, is illustrated in FIG. 11. Here a write amplifier has an output coupled input-wise to a write coil on a first bit delay line. The read coil for that line is coupled input-wise to a read amplifier, the output of which drives a write amplifier coupled input-wise to a write coil on a second 44 bit delay line. The output of the read coil of the second 44 bit delay line is coupled inputwise to a read amplifier which has a double ended output producing complementary output signals of a character suitable for input to flip-flop circuits. The input to the first write amplifier at the left side of circulating register CR2 is represented in a write flip-flop designated FQW2 having J and K input terminals and an output terminal QW2 connected to drive the write amplifier. Output QW2 represents the primary output of flip-flop FQW2. The gating networks for the J and K input terminals of flip-flop FQW2 are not shown at this point. Each of the write amplifiers in the circulating register are gated by means of clock pulses FTCP. These amplifiers may be transistor type pulse amplifiers in which the first stage requires the simultaneous occurrence of an input signal such as QW2 and a clock pulse FTCP. In such a transistor amplifier, the clock pulse which is a negative going signal may be applied, through a suitable calibrating resistor, directly to the emitter of a n-p-n transistor in which the emitter circuit is positively biased through a suitable resistor. The flip-flop signal QW2 may be applied through a suitable calibrating resistor into the base circuit of such a transistor. The polarities of the voltages, both input and bias, being such the magnitudes being such, as to afford pulsing of the amplifier each time a clock pulse occurs during the interval of existence of a voltage QW2. Succeeding amplifier stages driven by the transistor described may be utilized to achieve the electrical power required at the output of the amplifier, to drive the write coil at the input of each delay line section of the circulating register. The write amplifier intermediate the nickel delay line sections of the circulating register, is similar to that at the input to the circulating register and the read amplifier providing input to this write amplifier produces an output signal characteristic of a signal QW2, and is also controlled by a clock pulse FTCP.

The read amplifiers may be conventional arrangements of cascaded transistor amplifiers in common emitter circuit configurations in which the output of the read coil of a delay line register serving as input thereto is capacitor coupled into the base of the first stage transistor of the amplifier and the collector of each stage is capacitor coupled into the base of a succeeding stage. The output of the intermediate read amplifier is single ended, and, as earlier noted, produces an output which is characteristic of an electrical output QW2 of a flip-flop. The read amplifier at the output of the second delay line section as noted earlier is double ended and this may be accomplished by a simple inverter circuit arrangement of transistors so that complementary outputs are produced in the two output circuits. The output of the last read amplifier is utilized to provide J and K input signals to a read flip-flop FQR2 which functions as the output flip-flop of the circulating register. 88 bits of storage space are provided by the two 44 bit delay line sections. Amplifier delays are neglected in this consideration and are not sufficient to warrant consideration. The remaining two bits are stored in the write flip-flop FQW2 and in the read flip-flop FQR2. Thus, assuming a full line of binary information in the circulating register, the first binary bit will be stored in flip-flop FQR2 and the 90th binary bit will be stored in flip-flop FQW2.

FIG. 12 depicts the order of information in two circulating registers CR1 and CR2 of the type described in FIG. 11, CR1 being the present position register and CR2 being the desired position register. Storage facilities are provided for 90 information bits covering 30 bits for each of the X, Y and Z words represented. Each word is divided into three sections identified A, B, and C in which A represents the portion of the register assigned to dimension, B the portion for error checking, and C the control of input logic. This is the same for both of the registers as indicated.

Figure 13:
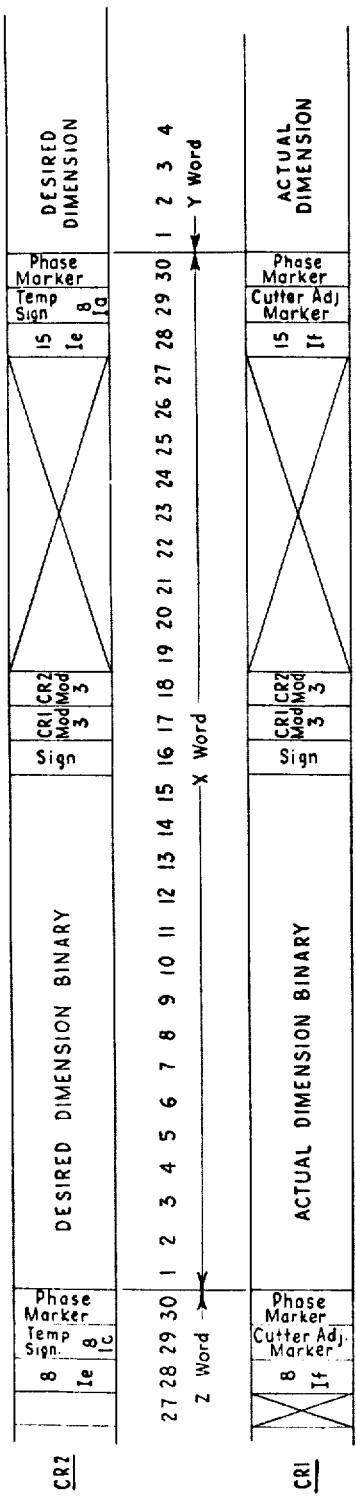
Figure 14:
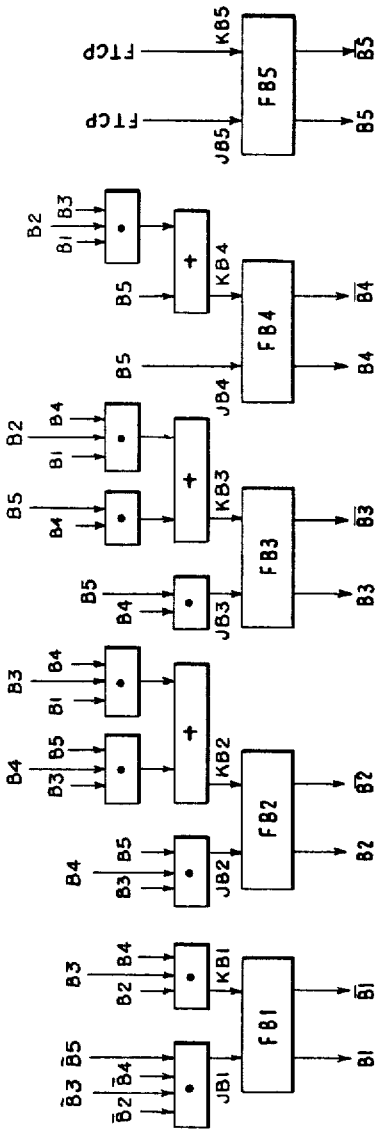

FIG. 13 shows the division of each of the circulating registers CR1 and CR2 within each word, the X word being shown for both of the registers, a fragmentary portion for the Z word appearing on the left end, a fragmentary portion of the Y word appearing right which depicts the closed loop circulating characteristic mode of operation of each of the registers for circulating information therein during intervals when information is not being changed. In the CR2 register, the desired binary dimensions, and, in the CR1 register, the actual binary dimensions are each assigned 15 bits. The information written in these registers is straight binary coding as noted thereinbefore. Negative numbers appear in the 2's complement form with bit time $b16$ being the sign bit. A mod 3 electronic check is made on each of the circulating registers and a mod 3 of the binary dimension as determined from electronic circuits yet to be described for the register CR1, or actual binary dimension, is written in bit 17 position in both of the circulating registers. Similarly, a mod 3 error calculation for the desired binary dimension is made and the result written in the bit time 18 position in each of the circulating registers. Bits 19 through 27 as shown are blank. Bit 28, in circulating register CR2, stores information from column $e$ row 15 of the tape, and, in register CR1, stores information from column $f$ row 15 of the tape. Bit 29 in register CR2 temporarily stores the sign which is read from column a row 8 of the tape at bit 29 time, and, in register CR1, a marker bit is written if a cutter adjustment is to be made. Bit 30 carries phase marker information in both circulating registers to control a phase counter, yet to be described, for the Y word which is coming up in the circulating register. Further information on the circulating registers and their function in the system will be provided in connection with the specific descriptions of the detailed circuits yet to follow.

CUTTER DIMENSION COMPENSATION

As earlier noted herein all dimensions for machine operations on a part are defined on the tape in a binary decimal code for a point cutter. This is compensated by a cutter adjustment feature involving a plurality of manually adjusted switches seen in FIG. 20 which are set in a suitable electrical configuration to indicate the magnitude of the compensation required for the particular cutter that is being used. Note that the actual measured cutter dimension is set on the switches, so that cutter wear is corrected merely by re-adjusting the switches.

Figures 8, 21:
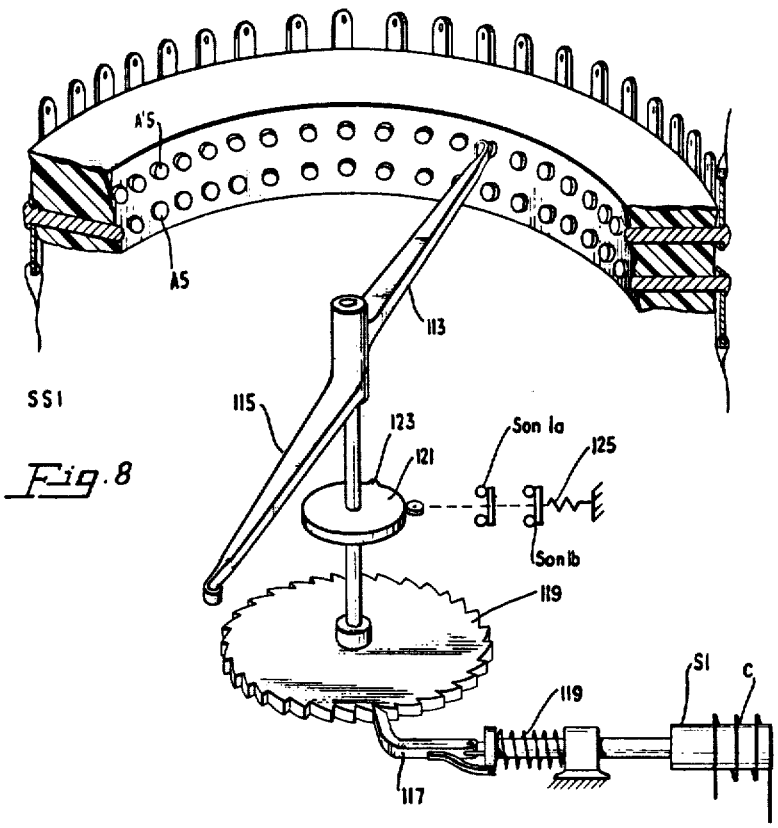
Figure 20:
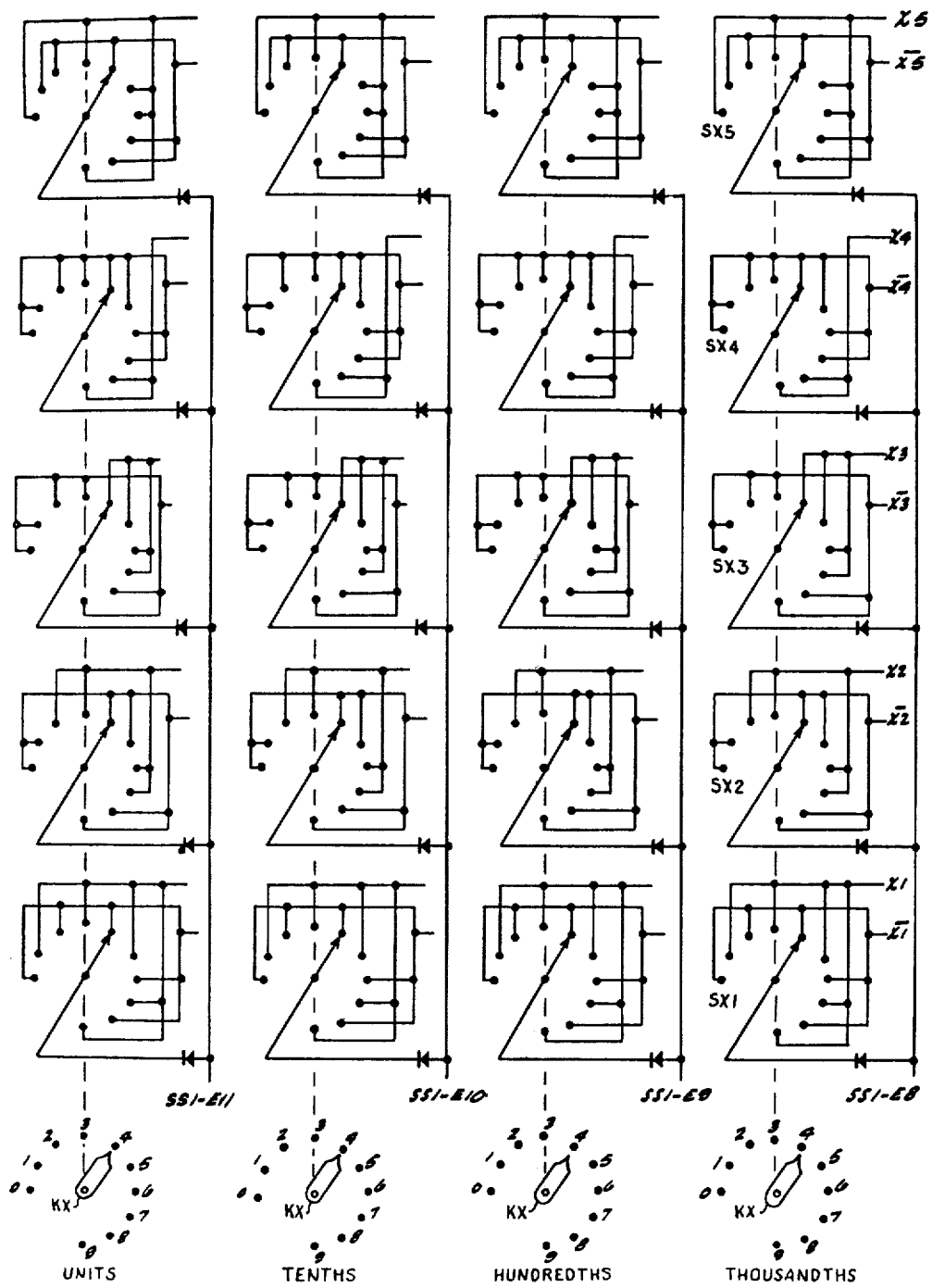

Physically the switches may be of conventional wafer type, each providing ten contact points. Each switch group SX1 through SX4 is mechanically ganged and is provided with a common control knob KX switchable between any one of ten switch positions provided by each of the wafer switches. These switches are wired in accordance with a binary decimal code as indicated in the table of FIG. 21 (on sheet 8 of the drawings) in which switch SX1 represents the $2^0$ bit, switch SX2 the $2^1$ bit, switch SX3 the $2^2$ bit and switch SX4 the $2^3$ bit. The manner in which the switches are wired, respectively, through the positions 0 through 9 indicated in the table, is represented by the 1's and 0's in each of the columns associated with each of the respective switches. Here also the primary, or "1," electrical condition of each of the switches is represented, with particular reference to switch SX1, for example, by X1 and the complementary, or "0," electrical condition represented by X1. Thus in switch SX1 the contacts are alternately connected to the X1 and X1 circuits. In switch SX2 the contacts are connected in adjacent pairs to the X2 and X2 circuits. In switch SX3 the contacts are connected in adjacent groups of four to the respective X3 and X3 circuits, etc. In each group of switches SX1 through SX4 an additional switch mechanically ganged with the group designated SX5 is provided. This is the parity switch and is wired for each of the switch positions to produce a 1 or a zero as required to produce an odd number of 1's. For example, in decimal position 0 of the switches the parity switch produces a 1 and again in decimal position 3, etc. The three remaining groups of switches are similarly connected. The switch groups as viewed from left to right in FIG. 20 are weighted units tenths, hundredths and thousandths. Thus any decimal number within the number capacity of the switches may be represented in binary coded decimal form by setting of the four switch knobs KX.

Figure 6:
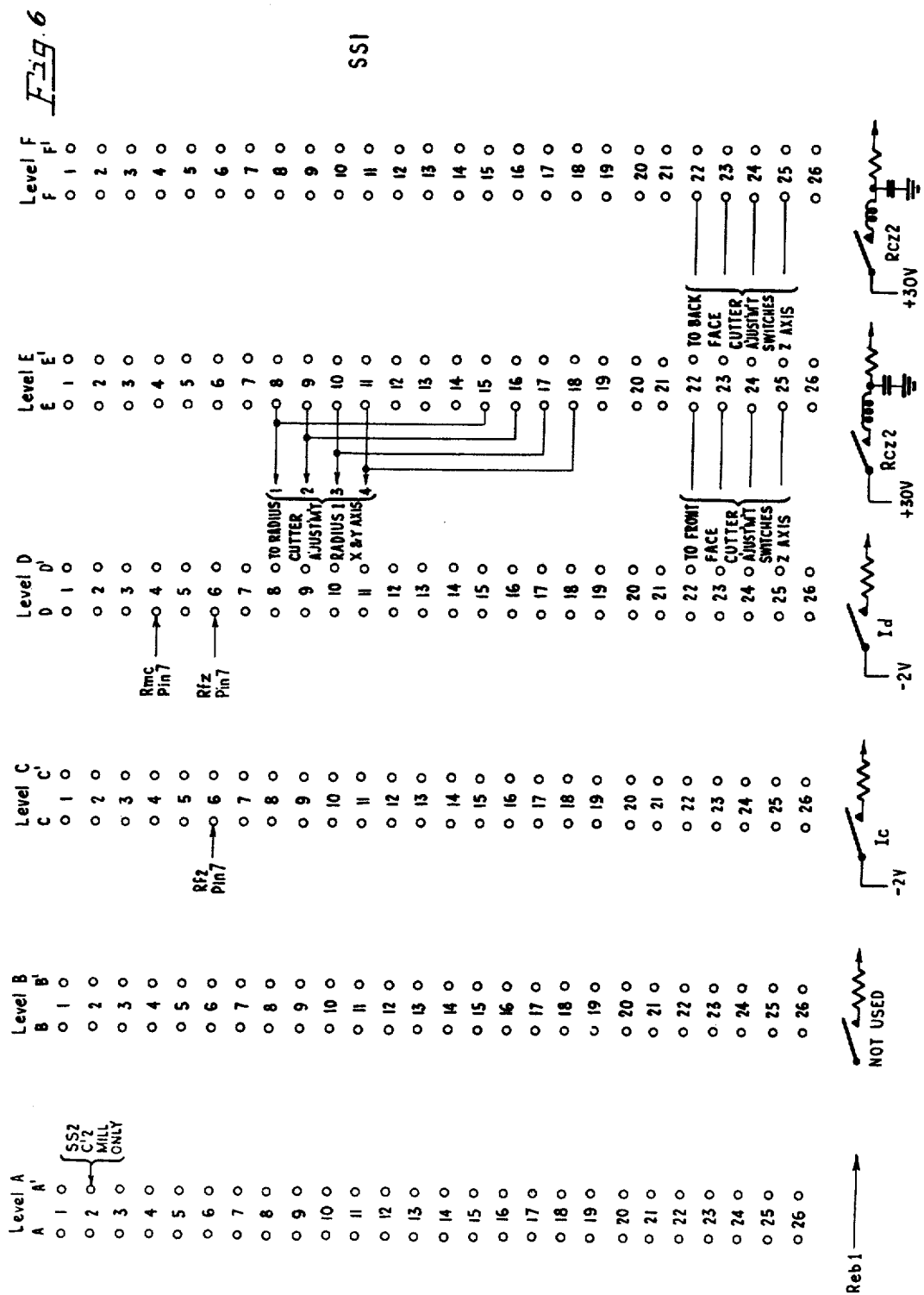
Figure 7:
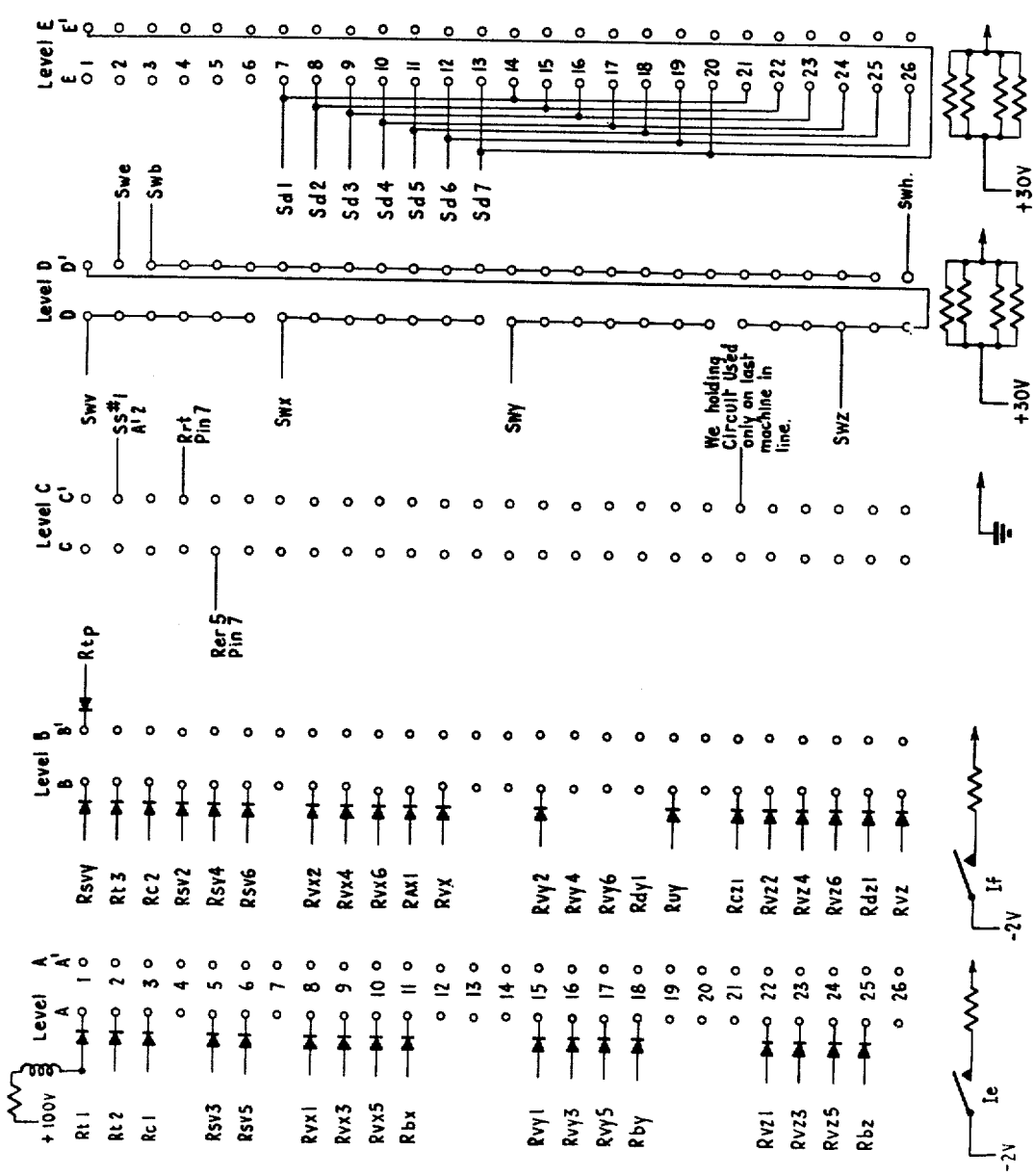

By reference to the stepping switch schematic, in FIG. 6, it will be noted that cutter adjustment corrections are provided on the mill for radius with respect to the X and Y axes and for front face and back face on the milling cutter in the Z axis. Each such cutter adjustment requires a battery of switches of the type illustrated in FIG. 20 and these are selectively switched depending upon the character of the cutter adjustment which is to be made. Further details concerning these switches will appear hereinafter.

Although but one embodiment of this invention has been herein illustrated and described, it will be appreciated by those skilled in the art that numerous changes in this invention both as to the details of the disclosed arrangements and as to the organization of the details may be made.

What is claimed is:

1. In a control system for positioning a controllable member to position a tool relative to a workpiece: an input signal system producing a group of discrete electrical signals in accordance with a fixed signal program based on a given assumed tool dimension; a discrete electrical signal producing system for producing discrete electrical signals each of which is indicative of a predetermined increment of displacement of said member; electrical comparator means receiving electrical signals from both said input signal system and said discrete electrical signal producing system and producing an electrical output when the signals of each system are different; electrically operated drive means receiving said electrical output and controlling said member; a manually adjustable discrete signal producing device selectively manually adjustable for registering a manually selected discrete tool offset value in accordance with the difference between the given assumed tool dimension on which the fixed signal program is based and an actual tool dimension; and means combining the discrete signals of said adjustable device with the discrete signals of said input signal system to change the positioning of the member from that represented by the fixed signal program in accordance with the manually selected discrete tool offset value registered by said manually adjustable discrete signal producing device.

2. In a numerically controlled machine tool system for controlling movement of a machine tool member with respect to a machine tool axis so as to relatively position a cutting tool and workpiece, said system comprising:
a. a preprogrammed input signal system operable during automatic operation for producing a sequence of preprogrammed machine tool instructions including preprogrammed groups of discrete coded electrical signals indicative of programmed positions of the machine tool member relative to said machine tool axis, and including a preprogrammed discrete correction signal representing polarity information needed to effect a correction in said machine tool instructions;
b. manually adjustable discrete signal device manually adjustable to supply a selected group of discrete coded correction signals representing cutting tool offset information needed to effect a correction in said machine tool instructions to compensate for cutting tool dimension;
c. a movement control system coupled to said input signal system and to said machine tool member and automatically operable during said automatic operation of said input signal system to effect the execution of the sequence of preprogrammed machine tool instructions; and
d. a signal processing system coupled with said input signal system and with said manually adjustable discrete signal device and with said movement control system, and automatically operable during automatic operation of said input signal system to respond to said preprogrammed groups of discrete coded electrical signals to control the operation of the movement control system in effecting the execution of said sequence of preprogrammed machine tool instructions, and responsive to said preprogrammed discrete correction signal to control the operation of the movement control system so as to offset the position of the machine tool member relative to said machine tool axis in accordance with said cutting tool offset information represented by the manually selected group of discrete coded correction signals and taking into account the polarity information represented by said preprogrammed discrete correction signal.

3. In a plural axis numerically controlled machine tool system for controlling movement of a machine tool with respect to a plurality of machine tool axes:
a. an input signal system operable during automatic operation thereof for producing a sequence of machine tool instructions including groups of discrete coded electrical signals indicative of desired positions of the machine tool expressed in numbers of displacement increments relative to the respective machine tool axes;
b. a movement control system coupled to said input signal system and automatically operable during automatic operation of said input signal system to move the machine tool through respective numbers of displacement increments relative to the respective machine tool axes required to execute said machine tool instructions; and
c. a signal processing system coupled with said input signal system and with said movement control system and automatically operable during automatic operation of said input signal system to control the operation of the movement control system in effecting execution of said sequence of machine tool instructions;
d. said signal processing system comprising circulating register means operable for circulating therein desired position discrete coded electrical signals representing numbers of displacement increments corresponding to desired positions relative to the respective machine tool axes and present position discrete coded electrical signals representing numbers of displacement increments corresponding to present positions relative to the respective machine tool axes;

e. said signal processing system further comprising arithmetic circuitry for the circulating register means automatically operable during automatic operation of said input signal system to receive and arithmetically process the contents of said circulating register means as it circulates from the circulating register means through said arithmetic circuitry and to supply the results of such arithmetic processing to said circulating register means for circulating therein, said arithmetic circuity being operable on a time sharing basis to process discrete coded electrical signals relative to the respective axes sequentially as they circulate from the circulating register means through said arithmetic circuitry;

f. said movement control system being coupled with the arithmetic circuitry for supplying thereto digital motion signals representing the increments to movement of the machine tool relative to the respective axes during each cycle of the circulating register means, and said arithmetic circuitry being automatically operable during automatic operation of said input signal system to sequentially arithmetically combine the digital motion signals for the respective machine tool axes with the appropriate corresponding digits of the discrete coded electrical signals for the respective axes as they are circulated through said arithmetic circuitry, thereby to sequentially update the respective present position discrete coded electrical signals for the respective axes.

* * * * *